(12) United States Patent
Joung et al.

(10) Patent No.: US 12,539,319 B2
(45) Date of Patent: Feb. 3, 2026

US012539319B2

(54) LACTOBACILLUS DELBRUECKII SUBSP. LACTIS CKDB001 STRAIN, AND COMPOSITION FOR PREVENTION, AMELIORATION, OR TREATMENT OF NON-ALCOHOLIC FATTY LIVER COMPRISING SAME

(71) Applicant: CKD BIO CORPORATION, Seoul (KR)

(72) Inventors: Hyunchae Joung, Gyeonggi-do (KR); Byoung-Kook Kim, Seoul (KR); Bo Hye Heo, Gyeonggi-do (KR); Min Ho Seo, Gyeonggi-do (KR); Woo Ri Kim, Incheon (KR)

(73) Assignee: CKD BIO CORPORATION, Seoul (KR)

( * ) Notice: Subject to any disclaimer, the term of this patent is extended or adjusted under 35 U.S.C. 154(b) by 489 days.

(21) Appl. No.: 17/913,210

(22) PCT Filed: Mar. 23, 2021

(86) PCT No.: PCT/KR2021/003584
§ 371 (c)(1),
(2) Date: Sep. 21, 2022

(87) PCT Pub. No.: WO2021/194225
PCT Pub. Date: Sep. 30, 2021

(65) Prior Publication Data
US 2023/0173002 A1    Jun. 8, 2023

(30) Foreign Application Priority Data
Mar. 23, 2020 (KR) .................. 10-2020-0034823

(51) Int. Cl.
| | |
|---|---|
| *A61K 35/747* | (2015.01) |
| *A23L 33/135* | (2016.01) |
| *A61K 35/745* | (2015.01) |
| *A61P 1/16* | (2006.01) |
| *C12N 1/20* | (2006.01) |
| *C12R 1/225* | (2006.01) |

(52) U.S. Cl.
CPC .......... *A61K 35/747* (2013.01); *A23L 33/135* (2016.08); *A61K 35/745* (2013.01); *A61P 1/16* (2018.01); *C12N 1/20* (2013.01); *C12R 2001/225* (2021.05)

(58) Field of Classification Search
None
See application file for complete search history.

(56) References Cited

U.S. PATENT DOCUMENTS 8,652,461 B2    2/2014    Meunier et al.

FOREIGN PATENT DOCUMENTS

| | | |
|---|---|---|
| JP | 2014-209849 A | 11/2014 |
| KR | 10-2018-0088353 A | 8/2018 |
| KR | 10-2128098 B1 | 6/2020 |
| WO | WO-2013/084971 A1 | 6/2013 |
| WO | WO-2020/041581 A1 | 2/2020 |

OTHER PUBLICATIONS

CP018215.1, *Lactobacillus delbrueckii* subsp. lactis strain KCCM 34717, complete genome, published Dec. 5, 2016 (Year: 2016).*
Johnson, Jethro S., et al. "Evaluation of 16S rRNA gene sequencing for species and strain-level microbiome analysis." Nature communications 10.1 (2019): 5029 (Year: 2019).*
CP145818, *Lactobacillus delbrueckii* subsp. lactis strain CKDB001 chromosome, complete genome, published Feb. 28, 2024 (Year: 2024).*
Appendix A, sequence alignment of SEQ ID No. 1 and CP018215 region 281621 to 283181 of the genome (Year: 2024).*
Abdellatef et al. Ameliorated effects of *Lactobacillus delbrueckii* subsp. lactis DSM 20076 and Pediococcus acidilactici NNRL B-5627 on Fumonisin B1-induced Hepatotoxicity and Nephrotoxicity in rats. asian journal of pharmaceutical sciences 11.2 (2016): 326-336 (Year: 2016).*
Sumida et al. "Involvement of free radicals and oxidative stress in NAFLD/NASH." Free radical research 47.11 (2013): 869-880 (Year: 2013).*
Huang, Yuanshe, et al. "Effect of probiotics therapy on nonalcoholic fatty liver disease." Computational and mathematical methods in medicine Jan. 2022. (2022): 7888076. (Year: 2022).*
International Search Report from corresponding PCT Application No. PCT/KR2021/003584, dated Jul. 6, 2021.
Khalil, A. A., et al; "Protective Role of Probiotic Lactic Acid Bacteria Against Dietary Fumonisin B1-induced Toxicity and DNA-Fragmentation in Sprague-Dawley Rats", Preparative Biochemistry & Biotechnology, 2015, vol. 45, pp. 530-550.

(Continued)

*Primary Examiner* — Louise W Humphrey
*Assistant Examiner* — Mary A Crum
(74) *Attorney, Agent, or Firm* — Harness, Dickey & Pierce, P.L.C.

(57) ABSTRACT

The present invention relates to a *Lactobacillus lactis* CKDB001 strain, and a composition for the prevention or treatment of non-alcoholic fatty liver comprising same. When the composition of the present invention is ingested, the composition has the effect of ameliorating high-fat diet-induced fatty cirrhosis and inflammations caused thereby, and thus the composition of the present invention can be effectively used as a preparation for ameliorating or treating non-alcoholic fatty cirrhosis and steatohepatitis.

1 Claim, 15 Drawing Sheets

Specification includes a Sequence Listing.

(56) References Cited

OTHER PUBLICATIONS

Notice of Allowance from corresponding Korean Patent Application No. 10-2020-0034823. dated Apr. 3, 2020.

Koutnikova, H., et al.; "Impact of bacterial probiotics on obesity, diabetes and non-alcoholic fatty liver disease related variables: a systematic review and meta-analysis of randomised controlled trials", *BMJ Open*, 2019, pp. 1-12.

Examination Report No. 2 from corresponding Australian Patent Application No. 2021242110, dated May 29, 2024.

\* cited by examiner

LACTOBACILLUS DELBRUECKII SUBSP. LACTIS CKDB001 STRAIN, AND COMPOSITION FOR PREVENTION, AMELIORATION, OR TREATMENT OF NON-ALCOHOLIC FATTY LIVER COMPRISING SAME

CROSS-REFERENCE TO RELATED APPLICATIONS

This application is a national phase application of PCT Application No. PCT/KR2021/003584 filed on Mar. 23, 2021, which claims the benefit of and priority to Korean Patent Application No. 10-2020-0034823 filed on Mar. 23, 2020. The entire disclosures of the applications identified in this paragraph are incorporated herein by references.

REFERENCE TO DEPOSIT OF BIOLOGICAL MATERIAL

This application contains a reference to a deposit of biological material, which the deposit is incorporated herein by reference. *Lactobacillus delbrueckii* subsp. *lactis* CKDB001 with accession number "KCTC 14149BP" was deposited on 3 Mar. 2020, *Bifidobacterium longum* CKDB004 strain with access number "KCTC 13671BP" was deposited on 23 Oct. 2018, and *Bifidobacterium breve* CKDB002 strain with accession number "KCTC 13893BP" was deposited on 19 Jul. 2019 under the Budapest Treaty to Korea Research Institute of Bioscience and Biotechnology (BRIBB) located at 181, Ipsin-gil, Jeongeup-si, Jeolllabuk-do 56212 Republic of Korea. Upon issuance of a patent, all restrictions upon the deposits will be irrevocably removed, and the Deposits are intended to meet the requirements of 37 CFR §§ 1.801-1.809. The deposits will be maintained in the depository for a period of 30 years, or 5 years after the last request, or for the effective, enforceable life of the patent, whichever is longer, and will be replaced if necessary, during that period; and the requirements of 37 CFR §§ 1.801-1.809 are met.

TECHNICAL FIELD

The present disclosure has been made with the support of the Ministry of Science and ICT of the Republic of Korea under Project No. 2018M3A9F3020942, which was conducted by Hallym University in the research program named "Development of pharmabiotics for chronic liver disease based on research into gut microbiome" as a branch of the research project titled "Microorganism control and applied source technology development", under the research management of the National Research Foundation of Korea, from 1 Apr. 2018 to 31 Dec. 2022.

The present disclosure relates to a *Lactobacillus delbrooki* subsp. *lactis* CKDB001 (*Lactobacillus lactis* CKDB001) strain and a composition comprising same for prevention or treatment of non-alcoholic fatty liver.

BACKGROUND ART

Nonalcoholic fatty liver disease (NAFLD) is one of the most common liver diseases worldwide due to the effects of metabolic syndrome on liver metabolism. The incidence of obesity and related diseases, including NAFLD, has increased rapidly in all age groups in the world. NAFLD includes non-alcoholic steatohepatitis (NASH), which can progress from pure fatty steatosis (fat infiltrates more than 5% of hepatocytes) to cirrhosis, liver failure, and hepatocellular carcinoma (HCC). Within the pathophysiology of NAFLD, there are glucose and lipid metabolism, genetic predisposition, environmental fat accumulation, and intestinal microbial factors. The risk of death from liver disease is remarkably increased in progressive fibrosis patients suffering from bridging fibrosis or cirrhosis. Recent advances in knowledge and technology about the human gut microbiota have changed our perspective on human disease and treatment. The human gut microbiota is a complex ecosystem composed of various bacteria with a total mass of about 1-2 kg. The gut microbiota maintains a close relationship with the host and plays an important role in vitamin production, the mucosal immune system, and bacterial translocation. The intestine is connected directly to the liver via the portal vein. The liver is also referred to as "gut-liver axis" as a major metabolic organ of gut products composed of important dietary nutrients and microbe-related components. Disturbance of the gut microbiome may lead to liver disease, including NAFLD. Conventional therapies for NAFLD are often ineffective due to poor compliance, lack of efficacy, or changes in diet and lifestyle. Theoretically, the regulation of gut microbiota through the administration of probiotics can be effective, and recent studies have revealed several possibilities to support this theory. *Lactobacillus* delbrueckii subsp. *lactis* is known as a beneficial strain capable of alleviating various diseases including enteritis and inflammatory and metabolic diseases. In the present disclosure, *Lactobacillus delbrueckii* subsp. *lactis* and *Bifidobacterium* strains and a combination thereof were evaluated for therapeutic effects in NAFLD mouse models.

DISCLOSURE OF INVENTION

Technical Problem

Figure 1A:
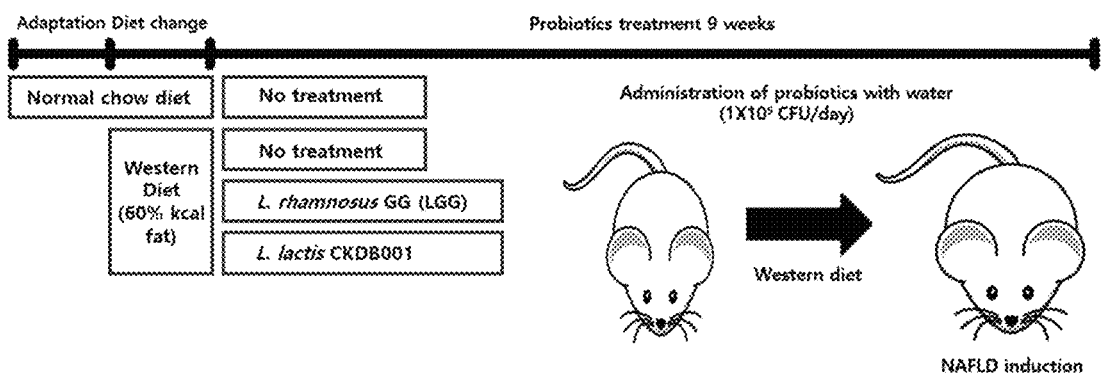
FIG. 1 is a receipt in the case of an original deposit for accession number KCTC 14149BP.

Leading to the present disclosure, intensive and thorough research conducted by the present inventors into the development of a lactic acid agent for prevention or treatment of non-alcoholic fatty liver disease resulted in isolating and identifying a *Lactobacillus delbrueckii* subsp. *lactis* CKDB001 strain and finding that a composite composition of the same strain and *Bifidobacterium* remarkably lowers the incidence of non-alcoholic fatty liver disease and inflammation.

Therefore, an aspect of the present disclosure is to provide a *Lactobacillus delbrueckii* subsp. *lactis* CKDB001 strain.

Another aspect of the present disclosure is to provide a composition containing a *Lactobacillus delbrueckii* subsp. *lactis* CKDB001 strain for prevention or treatment of non-alcoholic fatty liver disease.

A further aspect of the present disclosure is to provide a food composition containing a *Lactobacillus delbrueckii* subsp. *lactis* CKDB001 strain for prevention or alleviation of non-alcoholic fatty liver disease.

Solution to Problem

According to an aspect thereof, the present disclosure provides a *Lactobacillus delbrueckii* subsp. *lactis* CKDB001 strain with accession no. KCTC 14149BP.

According to another aspect thereof, the present disclosure provides a composition containing a *Lactobacillus delbrueckii* subsp. *lactis* CKDB001 strain with accession number KCTC 14149BP.

According to a further aspect thereof, the present disclosure provides a pharmaceutical composition containing a *Lactobacillus delbrueckii* subsp. *lactis* CKDB001 strain with accession no. KCTC 14149BP as an active ingredient for prevention or treatment of fatty liver disease.

According to another aspect thereof, the present
 disclosure provides a food composition containing *Lactobacillus delbrueckii* subsp. *lactis* CKDB001 strain with accession no. KCTC 14149BP as an active ingredient for prevention or alleviation of fatty liver disease.

The present inventors isolated a new strain which was named a *Lactobacillus delbrueckii* subsp. *lactis* CKDB001 strain with accession no. KCTC 14149BP. In addition, the present inventors prepared a lyophilizate powdered formulation with the strain and a mixture of a *Bifidobacterium* sp. strain therewith. The powdered formulation prepared with the strain or the mixed strains has a palliative or therapeutic effect on non-alcoholic fatty liver disease as it reduced steatosis and inflammation in test animal models of high-fat diet-induced non-alcoholic fatty liver disease when administered thereto.

As used herein, the term "fatty liver" refers to a case of fat deposition in the liver with neither hepatocellular damage (ballooning degeneration) nor fibrosis. The term "steatohepatitis" refers to a case of inflammatory findings accompanied by hepatocyte damage (balloon degeneration) while showing fat deposition in the liver. Steatohepatitis may be accompanied with liver fibrosis. The term "liver cirrhosis" means liver cirrhosis accompanied by histological findings of fatty liver or steatohepatitis, or liver cirrhosis occurring in a patient with fatty liver or steatohepatitis that has been histologically proven. Herein, definitions of the terms related to fatty liver disease are only intended to include various conditions related to fatty liver, and the conditions of patients defined according to the terms may not always be clearly distinguished.

In an embodiment of the present disclosure, the fatty liver is non-alcoholic fatty liver disease or alcoholic fatty liver disease.

As used herein, the term "non-alcoholic fatty liver disease" (NAFLD) refers to fatty liver disease caused by factors other than alcohol. The term "non-alcoholic fatty liver disease" is intended to encompass "non-alcoholic fatty liver disease", "non-alcoholic steatohepatitis", "non-alcoholic fatty liver-associated fibrosis", and "non-alcoholic fatty liver-associated cirrhosis", which are all in hepatocytic fat accumulated states due to factors other than alcohol.

In the present disclosure, the *Lactobacillus delbrueckii* subsp. *lactis* CKDB001 was deposited with the Korean Collection for Type Culture (KCTC) under accession n. KCTC 14149BP. Hereinafter the *Lactobacillus delbrueckii* subsp. *lactis* CKDB001 is abbreviated to *Lactobacillus lactis* or *Lactobacillus lactis* strain CKDB001.

Cell states of the *Lactobacillus delbrueckii* subsp. *lactis* CKDB001 strain are as follows:
 1) Bacterial morphology: Gram-positive rod or coccobacillus
 2) Physiological properties: The bacterium is a facultative anaerobe that optimally grows at a temperature of 36-38° C. and a pH of 5.5-5.8 and is asporogenous without motility.
 3) It is generally isolated from fermented milk or cheese and considered safe for use in foods (probiotics and dairy products).

In an embodiment of the present disclosure, the composition further contains a *Bifidobacterium* sp. strain as an active ingredient.

Examples of the *Bifidobacterium* sp. strain include, but are not limited to, *Bifidobacterium bifidum*, *Bifidobacterium lactis*, *Bifidobacterium animalis lactis*, *Bifidobacterium longum*, *Bifidobacterium breve*, and the like, more specifically, *Bifidobacterium longum* and *Bifidobacterium breve*.

In a particular embodiment of the present disclosure, the *Bifidobacterium longum* is a *Bifidobacterium longum* CKDB004 strain, and is deposited with the KCTC under accession number "KCTC 13671 BP".

In another particular embodiment of the present disclosure, the *Bifidobacterium breve* is a *Bifidobacterium breve* CKDB002 strain, and is deposited with the KCTC under accession number "KCTC 13893BP".

The cell states of the *Bifidobacterium longum* strain are as follows:
 1) Bacterial morphology: Gram-positive, amorphous rod-shaped
 2) Physiological properties: The bacterium is an absolute anaerobe with an optimal growth temperature of 36-38° C. and an optimal pH of 6.5-7.0. It lacks motility and gelatin liquefaction and cannot produce endospores.
 3) It is isolated in the human digestive system and is most often found and isolated in the intestines of newborns who have been breastfed after birth. It is considered safe for use in foods (probiotics and dairy products).

The cell states of the *Bifidobacterium breve* strain are as follows:
 1) Bacterial morphology: Gram-positive, amorphous rod-shaped
 2) The bacterium is an absolute anaerobe with an optimum growth temperature of 36-38° C. and an optimum pH of 6.5-7.0. It lacks motility and gelatin liquefaction and cannot produce endospores.
 3) It is isolated from the human digestive system and is most often found in the intestines of newborns who have been breastfed after birth. It is considered safe for use in foods (probiotics and dairy products).

The biochemical properties of the aforementioned strains of the present disclosure are given in Table 1 below, and the 16s rRNA sequences of each strain are shown in SEQ ID NO: 1 to SEQ ID NO: 3.

TABLE 1

| Source | | L. lactis CKDB001 | B. longum CKDB004 | B. breve CKDB002 |
|---|---|---|---|---|
| Temoin | 0 | + | + | + |
| Glycerol | 1 | − | − | − |
| Erythritol | 2 | − | − | − |
| D-Arabinose | 3 | − | − | − |
| L-Arabinose | 4 | − | + | − |
| D-Ribose | 5 | − | − | − |
| D-Xylose | 6 | − | + | − |
| L-Xylose | 7 | − | − | − |
| D-Adonitol | 8 | − | − | − |
| Methyl-lolXylopyranoside | 9 | − | − | − |
| D-Galactose | 10 | − | + | + |
| D-Glucose | 11 | + | + | − |
| D-Fructose | 12 | + | + | − |
| D-Mannose | 13 | + | − | + |
| L-Sorbose | 14 | − | − | − |
| L-Rhamnose | 15 | − | − | − |
| Dulcitol | 16 | − | − | − |

TABLE 1-continued

| Source | | L. lactis CKDB001 | B. longum CKDB004 | B. breve CKDB002 |
|---|---|---|---|---|
| Inositol | 17 | − | − | − |
| D-Mannitol | 18 | − | + | − |
| D-Sorbitol | 19 | − | + | − |
| Methyl-tolMannopyranoside | 20 | − | − | − |
| Methyl-ranGlucopyranoside | 21 | − | − | − |
| N-Acetylglucosamine | 22 | + | − | + |
| Amygdaline | 23 | − | − | − |
| Arbutine | 24 | − | − | − |
| Esculine, citrate de fer | 25 | − | − | − |
| Salicine | 26 | − | + | − |
| D-Cellobiose | 27 | − | − | − |
| D-Maltose | 28 | w | + | + |
| D-Lactose | 29 | + | + | + |
| D-Melibiose | 30 | − | + | + |
| D-Saccharose | 31 | + | + | + |
| D-Trehalose | 32 | + | − | − |
| Inuline | 33 | − | − | − |
| D-Melezitose | 34 | − | − | − |
| D-Raffinose | 35 | − | + | + |
| Amidon | 36 | − | − | − |
| Glycogene | 37 | − | − | − |
| Xylitol | 38 | − | − | − |
| Gentiobiose | 39 | − | − | + |
| D-Turanose | 40 | − | + | − |
| D-Lyxose | 41 | − | − | − |
| D-Tagatose | 42 | − | − | − |
| D-Fucose | 43 | − | − | − |
| L-Fucose | 44 | − | − | − |
| D-Arabitol | 45 | − | − | − |
| L-Arabitol | 46 | − | − | − |
| Potassium GlucoNaTe | 47 | − | − | − |
| Potassium 2-CetoGluconate | 48 | − | − | − |
| Potassium 5-CetoGluconate | 49 | − | − | − |

When used as an active ingredient in the compositions of the present disclosure, the strain is intended to encompass an isolated and/or purified cell mass thereof, a cell culture including the cell mass, an extract from the cell mass, a supernatant of the culture, a concentrated liquid, concentrate, or dried substance thereof, a dilution or a diluted substance thereof as necessary, and any product obtained by processing the cell culture or medium.

The cell culture method, extraction method, separation method, concentration method, drying method, dilution method, etc. are not particularly limited.

A medium for culturing the cells typically contains milk proteins such as skim milk, whey, and casein, sugars, yeast extracts, etc., and various general aerobic or anaerobic methods can be appropriately used as the culture method.

Also useful is a neutralization culture method in which the culture temperature is set to be, for example, 30 to 40° C. and the medium is maintained at a neutral to acidic state, for example, at a pH of 5 to 6 using alkali such as sodium hydroxide during cultivation. In addition to the neutralization culture method, any culture method such as a batch culture method may be used. After culturing, if necessary, the culture or its supernatant may be concentrated, dried, diluted, or the like.

Furthermore, a cell culture is separated by centrifugation or through a membrane into a supernatant and a cell mass which may be concentrated and recovered as a concentrate. Moreover, the cell mass may be subjected to ultrasonication or enzymatic treatment to extract the components in the cell mass. In an alternative, the culture or the supernatant thereof, or the cells mass or the extract thereof may be dried. These matters can be used as an active ingredient in the composition of the present disclosure.

When the composition of the present disclosure is prepared as a food composition, it may include an additive commonly used in food production as well as the lactic acid bacteria as an active ingredient. Examples of the additive includes proteins, carbohydrates, fats, nutrients, seasonings and flavoring agents. The carbohydrates may be common sugars, such as monosaccharides (e.g., glucose, fructose, etc.), disaccharides (e.g., maltose, sucrose, oligosaccharides, etc.), and polysaccharides (e.g., dextrin, cyclodextrin, etc.), and sugar alcohols, such as xylitol, sorbitol, erythritol, and the like. As flavoring agents, natural flavoring agents (taumatin, stevia extract (e.g., rebaudioside A, glycyrrhizin, etc.)) and synthetic flavoring agents (saccharin, aspartame, etc.) can be used.

For instance, when the food composition of the present disclosure is prepared as a drink, citric acid, high fructose corn syrup, sugar, glucose, acetic acid, malic acid, fruit juice, a jujube extract, or a licorice extract may be additionally included in addition to the strain as an active ingredient of the present disclosure.

The food composition of the present disclosure includes processed forms of all natural materials, such as foods, functional foods, nutritional supplements, health foods, and food additives. These types of food compositions can be prepared in various forms according to conventional methods known in the art.

For health foods, for example, the lactic acid bacteria themselves may be prepared into beverage forms, such as tea, juices, and drinks, or into granules, capsules, and powders. As foods, beverages (inclusive of alcoholic beverages), fruits and processed foods thereof (e.g., canned fruits, bottled foods, jam, marmalade, etc.), fishes, meats, and processed foods thereof (e.g., ham, sausage corn beef, etc.), breads and noodles (e.g., udon noodles, soba noodles, ramen, spaghetti, macaroni, etc.), fruit juices, various drinks, cookies, syrup, dairy products (e.g., yogurt, fermented milk, butter, cheese, etc.), edible vegetable oils and fats, margarine, vegetable proteins, retort foods, frozen foods, various seasonings (e.g., soybean paste, soy sauce, sauce, etc.) can be added with the lactic acid bacteria of the present disclosure. Furthermore, for use in the form of a food additive, the lactic acid bacteria of the present disclosure may be prepared into powders or concentrated liquids.

When the composition of the present disclosure is prepared as a pharmaceutical composition, the pharmaceutical composition includes a pharmaceutically acceptable carrier. So long as it is commonly used for typical formulations, any pharmaceutically acceptable carrier is available in the pharmaceutical composition of the present disclosure. Examples of the pharmaceutically acceptable carrier include lactose, dextrose, sucrose, sorbitol, mannitol, starch, acacia gum, calcium phosphate, alginate, gelatin, calcium silicate, microcrystalline cellulose, polyvinylpyrrolidone, cellulose, water, syrup, methyl cellulose, methyl hydroxybenzoate, propyl hydroxybenzoate, talc, magnesium stearate and mineral oil, but with no limitations thereto. The pharmaceutical composition of the present disclosure may further include a lubricant, a humectant, a sweetener, a flavoring agent, an emulsifier, a suspending agent, a preservative, and the like, in addition to the above components.

The pharmaceutical composition of the present disclosure may be administered orally or parenterally and is preferably applied by oral administration. The pharmaceutical composition of the present disclosure may be formulated in the following various oral or parenteral dosage forms, but is not limited thereto.

Formulations for oral administration include, for example, tablets, pills, hard/soft capsules, solutions, suspensions, emulsions, syrups, granules, elixirs, and the like. In these formulations, one or more common diluents or excipients such as fillers, extenders, wetting agents, disintegrants, lubricants, binders, and surfactants may be used in addition to the active ingredient. The disintegrant may be exemplified by agar, starch, alginic acid or sodium salt thereof, calcium monohydrogen phosphate anhydride, etc. Available the lubricant include are silica, talc, stearic acid or a magnesium or calcium salt thereof, polyethylene glycol, etc. Examples of the binder include magnesium aluminum silicate, starch paste, gelatin, tragacanth, methyl cellulose, sodium carboxymethyl cellulose, polyvinyl pyrrolidine, and low-substituted hydroxypropyl cellulose. Lactose, dextrose, sucrose, mannitol, sorbitol, cellulose, or glycine, may be used as a diluent. In some cases, commonly known azeotropes, absorbents, colorants, flavorants, sweeteners, and the like may be used together.

The composition may be sterilized or contain supplements such as preservatives, stabilizers, wetting agents or emulsification accelerators, salts for regulating osmotic pressures, buffers, etc., and other therapeutically useful substances, and may be formulated according to a typical method, such as mixing, granulation, or coating methods.

A suitable dose of the pharmaceutical composition of the present disclosure may vary depending on various factors including formulation methods, administration modes, the patient's age, body weight, and sex, the severity of disease symptoms, the duration of administration, the route of administration, the excretion rate, and response sensitivity.

In an embodiment of the present disclosure, the total lactic acid bacteria in the composition may be administered at a dose of $1\times10^7$-$1\times10^{12}$, $1\times10^8$-$1\times10^{12}$, $1\times10^9$-$1\times10^{12}$, $1\times10^{10}$-$1\times10^{12}$, $1\times10^7$-$1\times10^{11}$, $1\times10^7$-$1\times10^{10}$, $1\times10^7$-$1\times10^9$, $1\times10^7$, $1\times10^8$, $1\times10^9$, $1\times10^{10}$, or $1\times10^{11}$ cfu/day, but with no limitations thereto.

The pharmaceutical composition of the present disclosure may be formulated with a pharmaceutically acceptable carrier and/or excipient and prepared into a unit dosage form or enclosed in a multiple-dose container according to a method that could be easily performed by a person skilled in the art to which the present disclosure pertains. In this regard, the formulation may be in the form of a solution, suspension, or emulsion in an oily or aqueous medium, or an extract, pulvis, powders, granules, tablets, or capsules, and may additionally include a dispersant or a stabilizer.

According to another aspect thereof, the present disclosure provides a method for prevention or treatment of fatty liver disease, the method comprising a step of administering to a subject a pharmaceutical composition containing *Lactobacillus delbrueckii* subsp. *lactis* CKDB001 with accession no. KCTC 14149BP as an active ingredient for prevention or treatment of non-alcoholic fatty liver disease.

As used herein, the term "administration" or "administering" refers to directly administering a therapeutically or prophylactically effective amount of the composition of the present disclosure to a subject (individual) suffering from or likely to suffer from the target disease to form the same amount in the body of the subject.

The term "therapeutically effective amount" of the composition, as used herein, means an amount of the composition sufficient to provide a therapeutic or prophylactic effect to a subject to which the composition is administered, and thus is intended to encompass a "prophylactically effective amount".

In addition, as used herein, the term "subject (individual)" refers to mammals, including humans, mice, rats, guinea pigs, dogs, cats, horses, cattle, pigs, monkeys, chimpanzees, baboons and rhesus monkeys. Most specifically, the subject of the present disclosure is a human.

Since the method for preventing or treating fatty liver disease according to the present disclosure includes administering the pharmaceutical composition according to an aspect of the present disclosure, the overlapping description therebetween is omitted in order to avoid overdue complexity of the present specification.

Advantageous Effects of Invention

The present disclosure provides a *Lactobacillus lactis* CKDB001 stain, a composition containing the strain and/or a *Bifidobacterium* strain for prevention, alleviation, or treatment of non-alcoholic fatty liver. When ingested, the composition of the present disclosure has an effect of alleviating high-fat diet-induced fatty liver disease and the resulting inflammation. Thus, the composition of the present disclosure can find advantageous applications as an agent for alleviation or treatment of non-alcoholic fatty liver disease and steatohepatitis.

BRIEF DESCRIPTION OF DRAWINGS

Figure 1B:
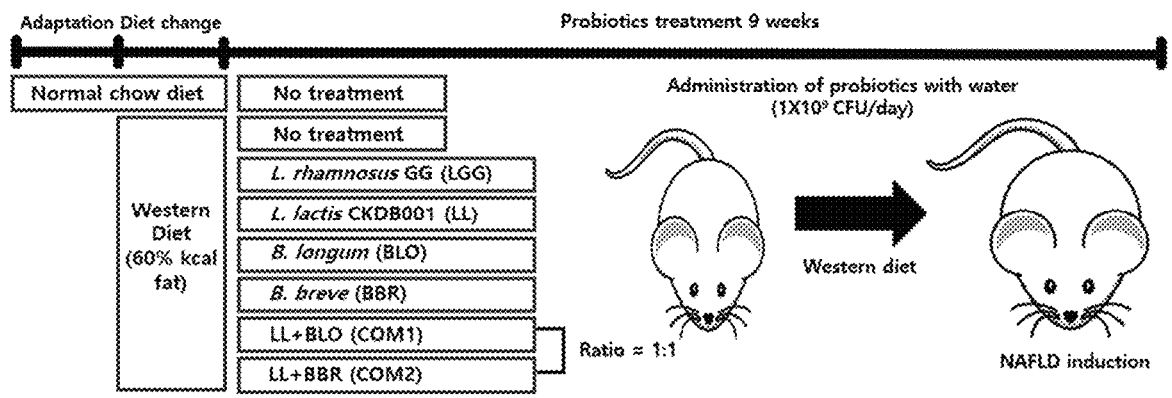

FIGS. 1a and 1b are schematic views of designs for experiment methods of the present disclosure.

Figure 2A:
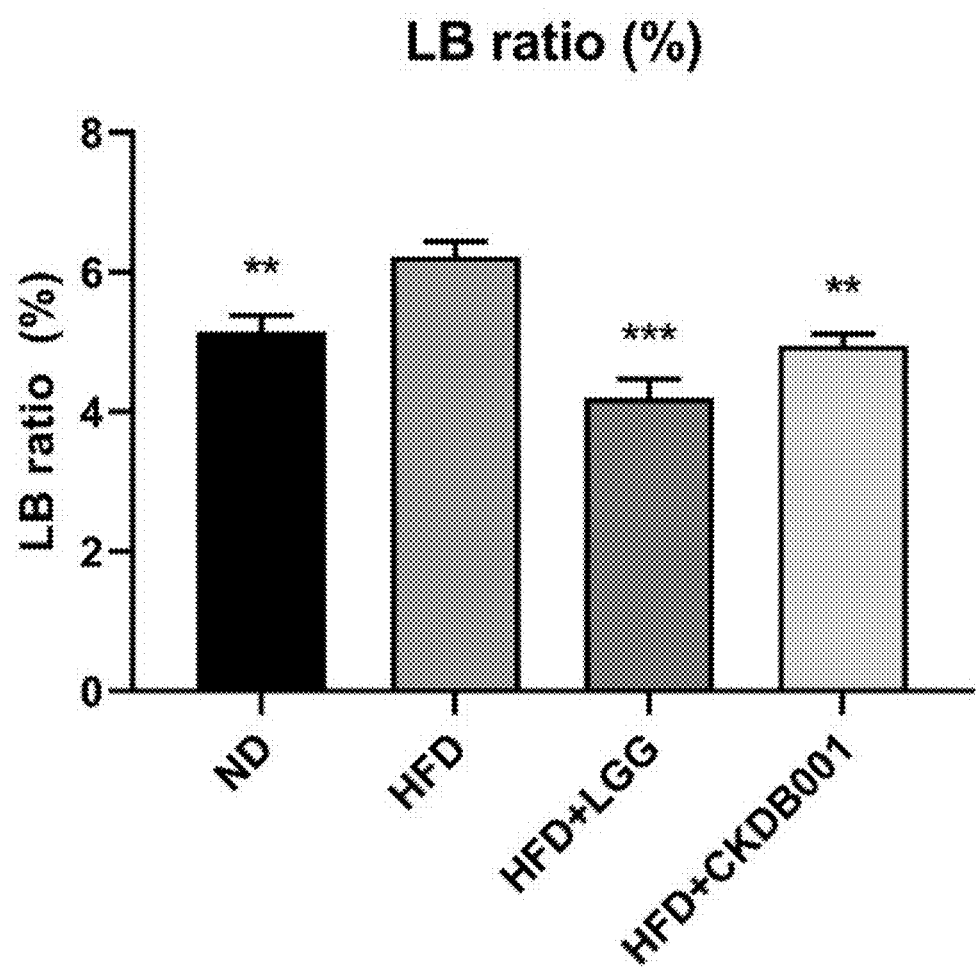
FIG. 2 is a receipt in the case of an original deposit for accession number KCTC 13671 BP.
Figure 2B:
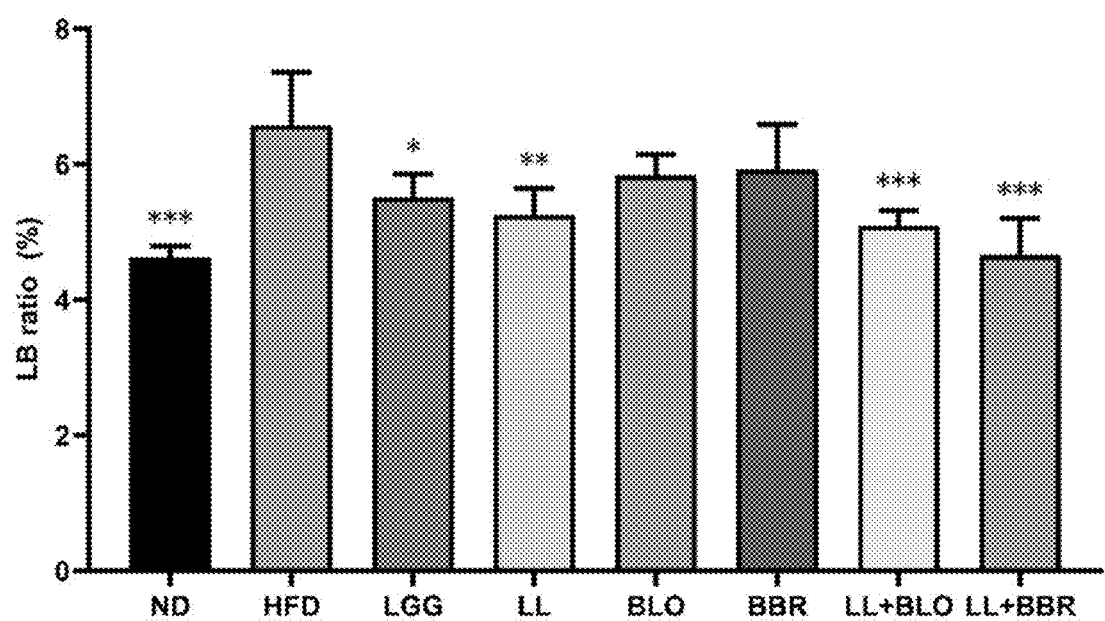

FIGS. 2a and 2b are graphs of liver/body weight ratios of mice after 9 weeks of administration of single or composite strains of the present disclosure while feeding a normal diet or a western diet thereto.

Figure 3A:
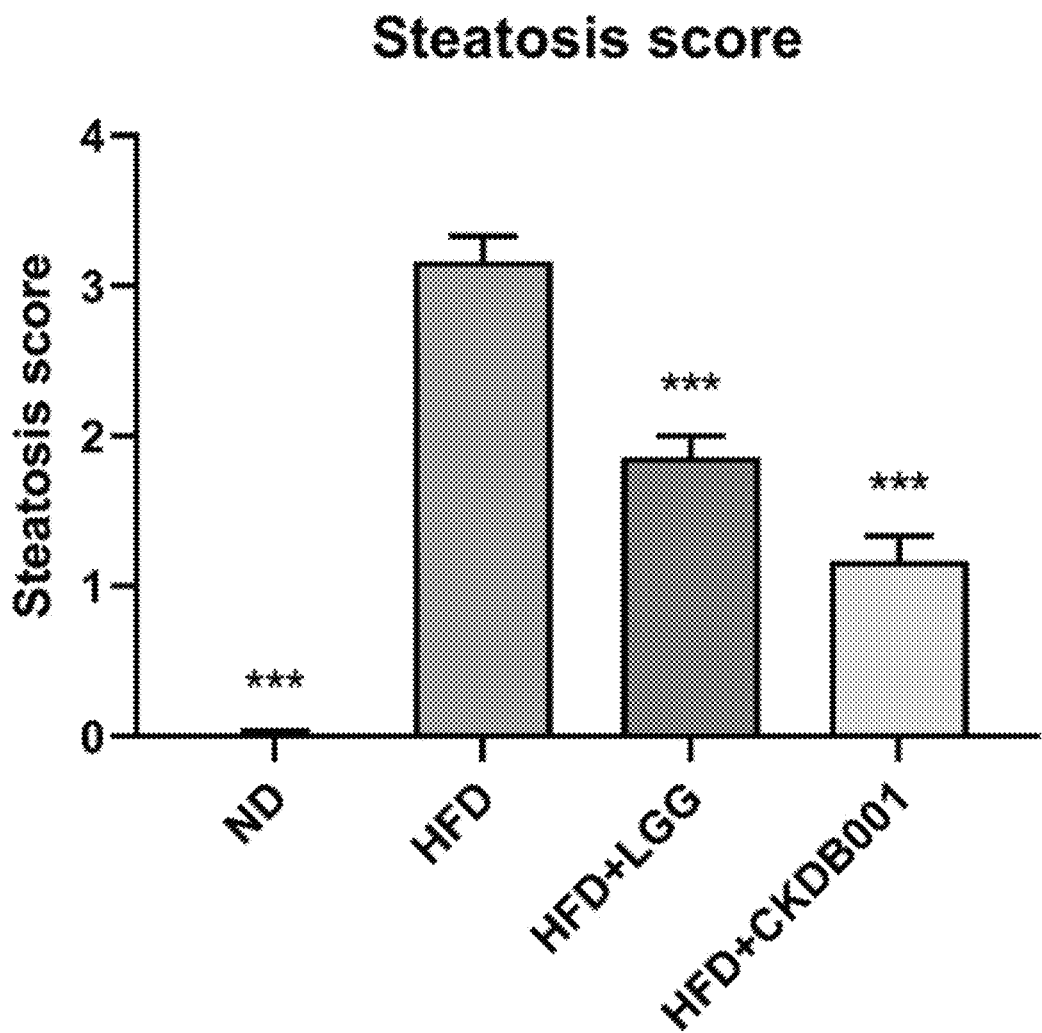
FIG. 3 is a receipt in the case of an original deposit for accession number KCTC 13893BP.
Figure 3B:
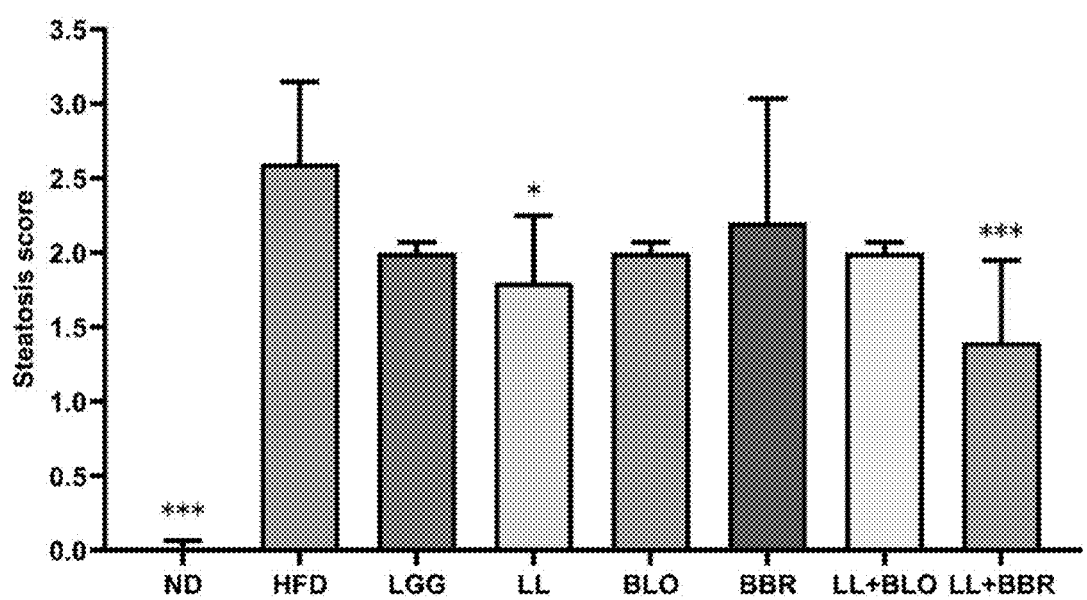
Figure 4A:
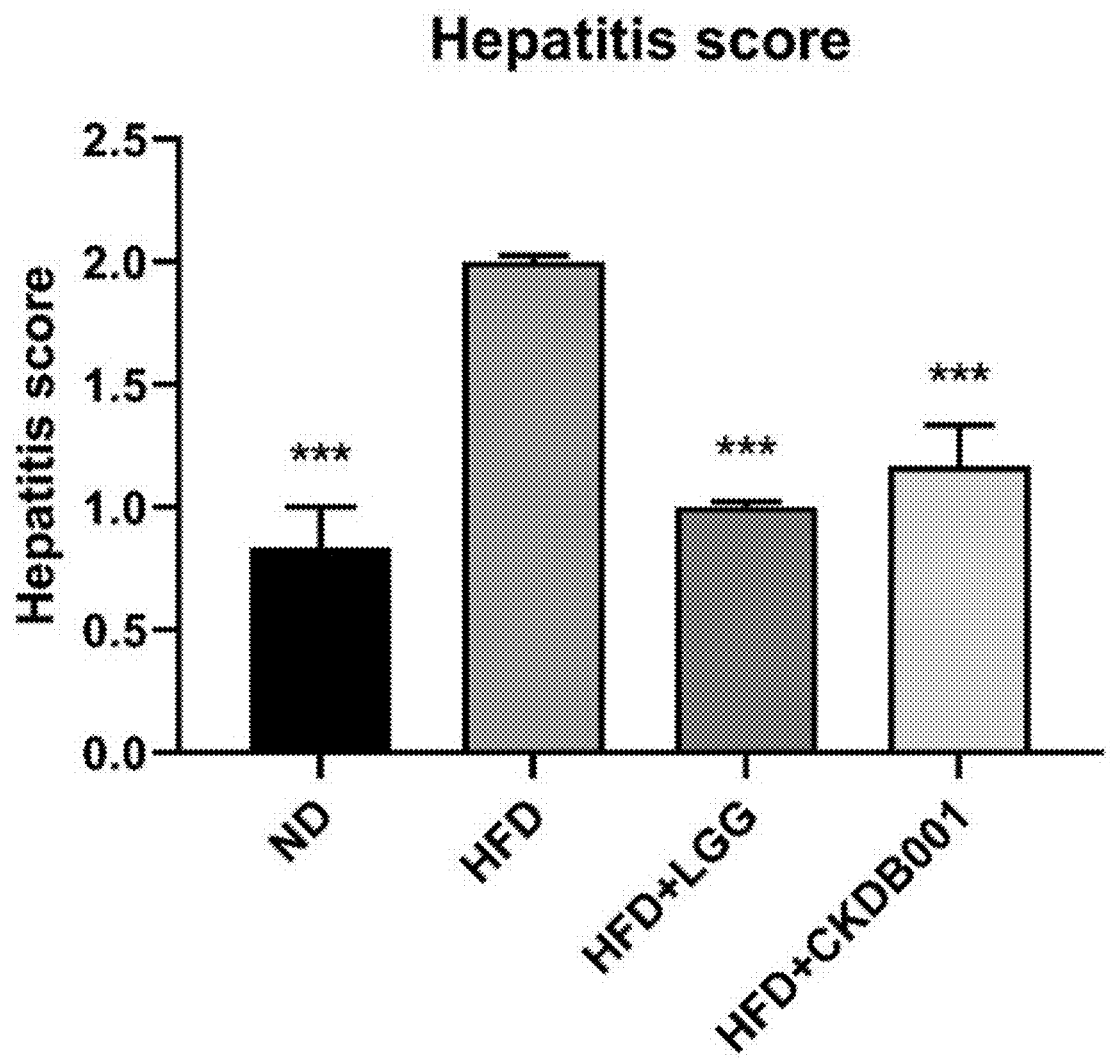
Figure 4B:
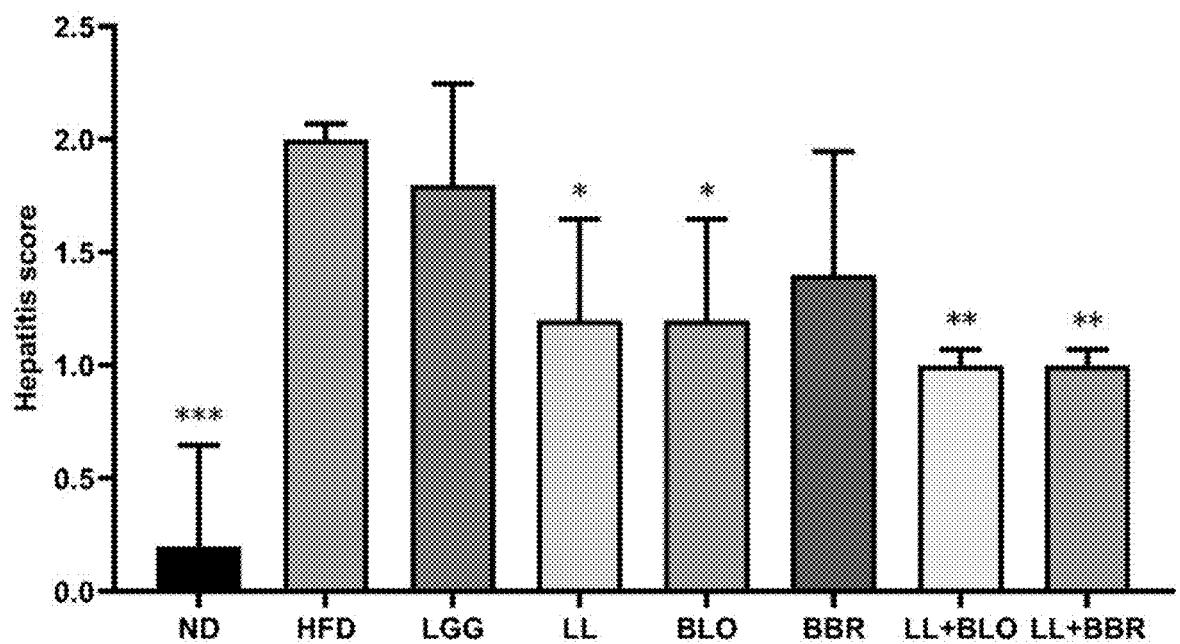

FIGS. 3a and 3b and FIGS. 4a and 4b are graphs of histopathological examination results of mice after 9 weeks of administration of single or composite strains of the present disclosure while feeding a normal diet or a western diet thereto (FIGS. 3a and 3b: fat infiltration, FIGS. 4a and 4b: inflammation).

Figure 5A:
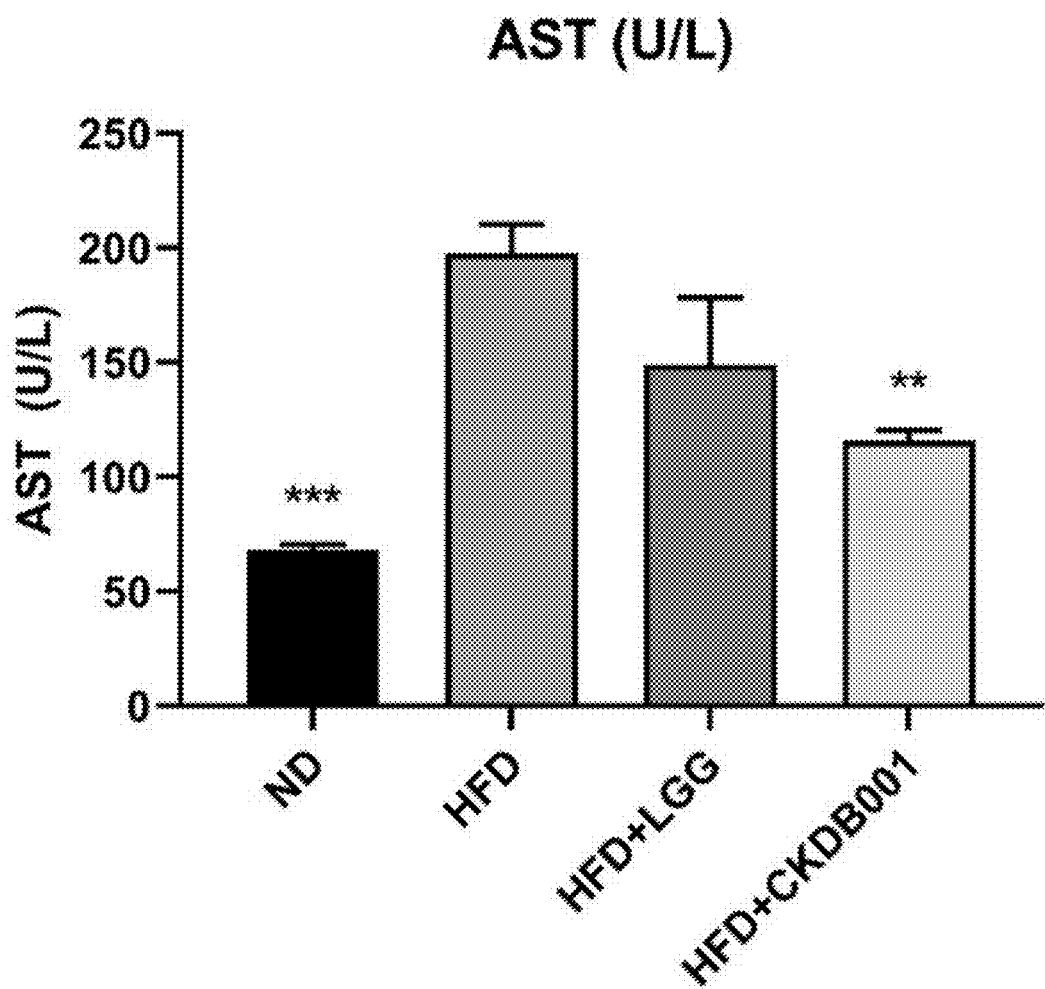
Figure 5B:
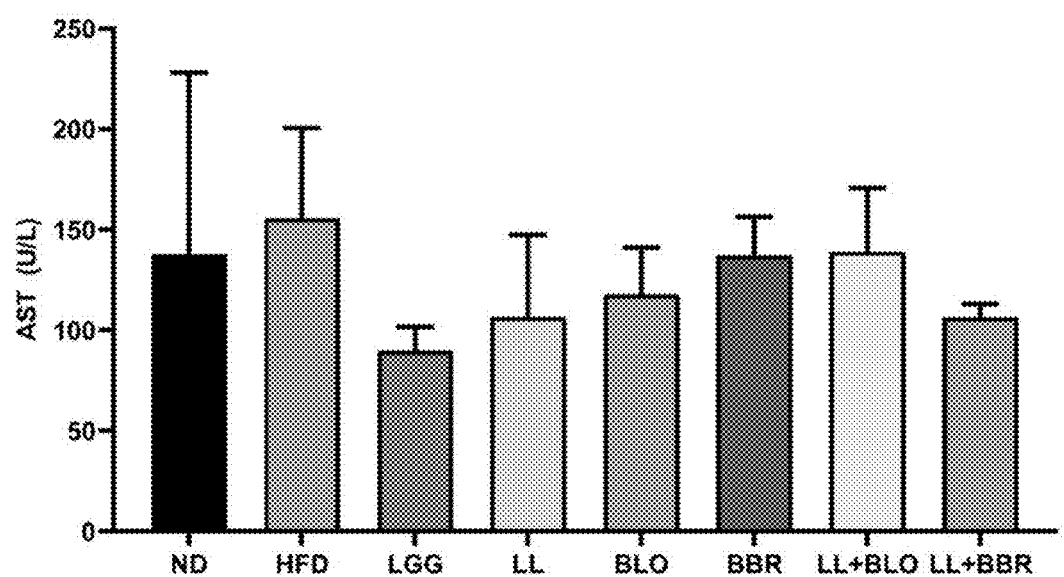

FIGS. 5a and 5b and FIGS. 6a and 6b are graphs of levels of liver enzymes (AST and ALT) in blood of mice after 9 weeks of single or composite strains of the present disclosure while feeding a normal diet or a western diet thereto (FIGS 5a and 5b: AST, FIGS. 6a and 6b: ALT).

Figure 7A:
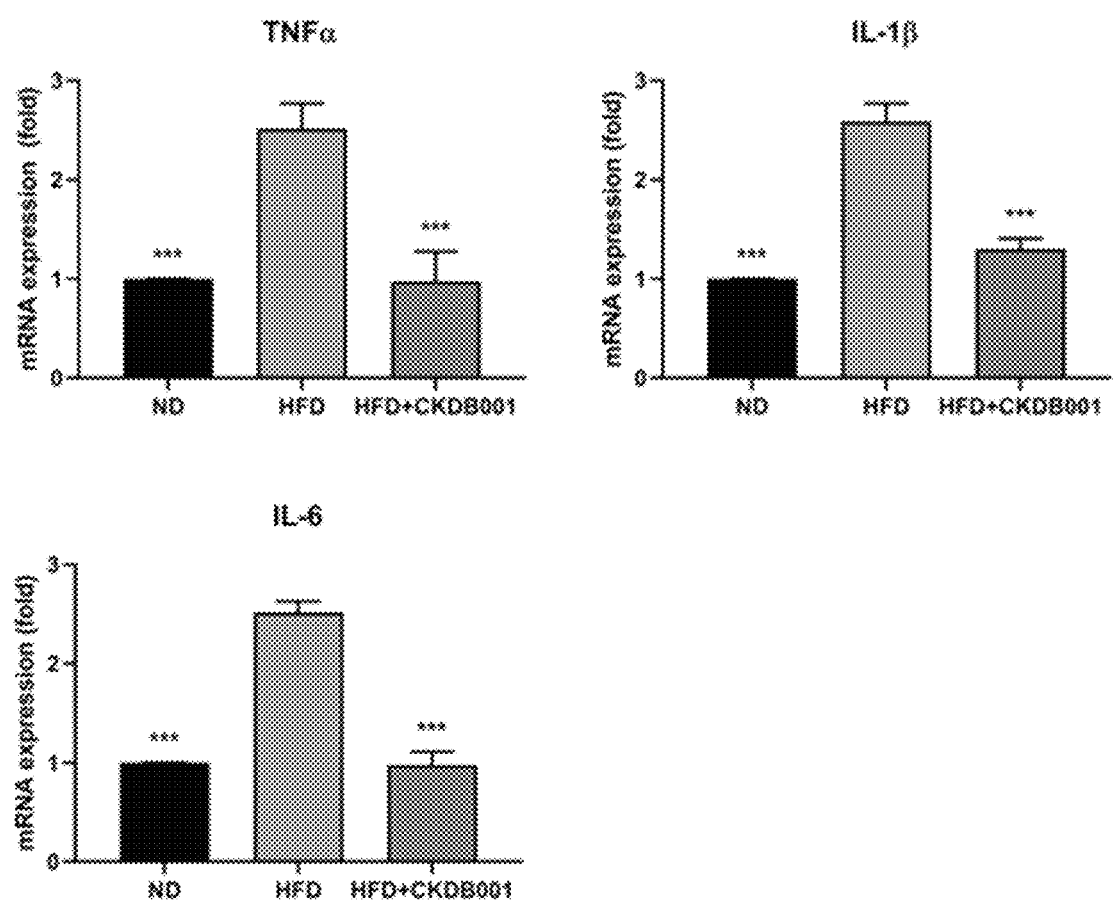
Figure 7B:
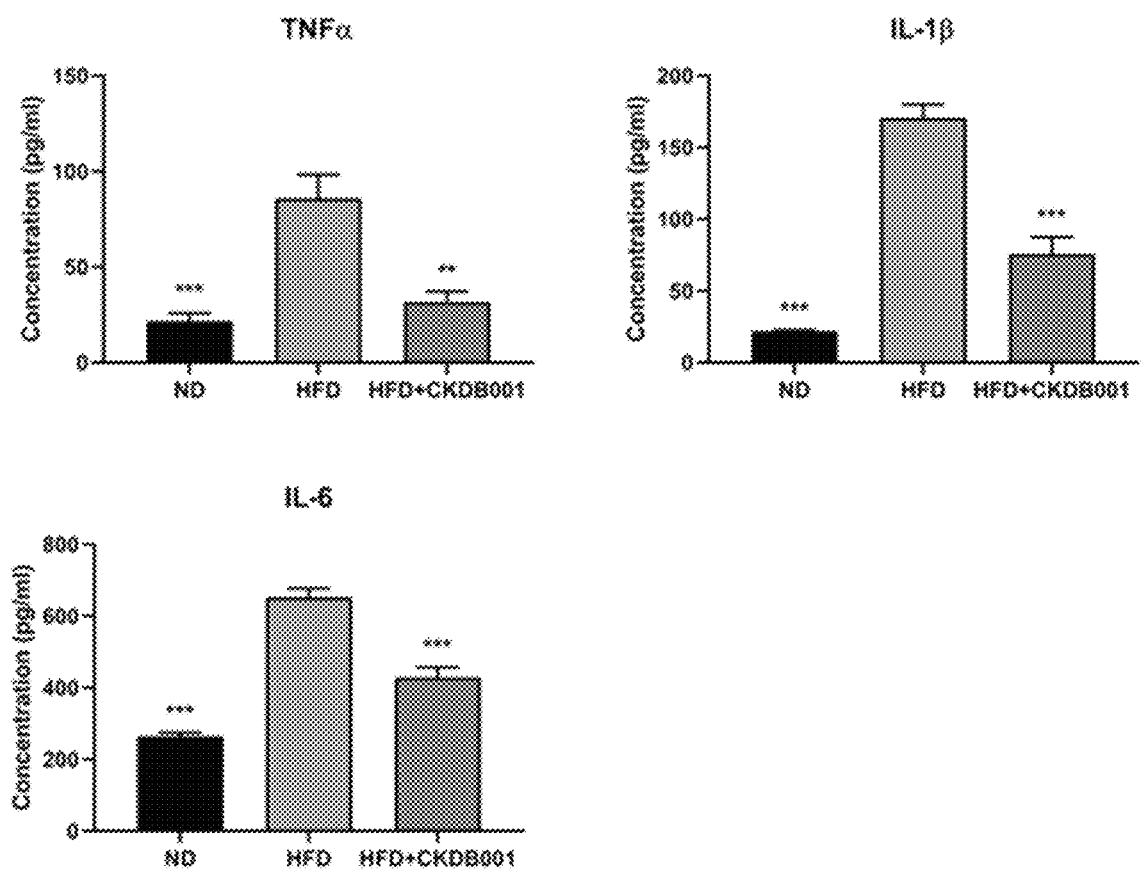
Figure 7C:
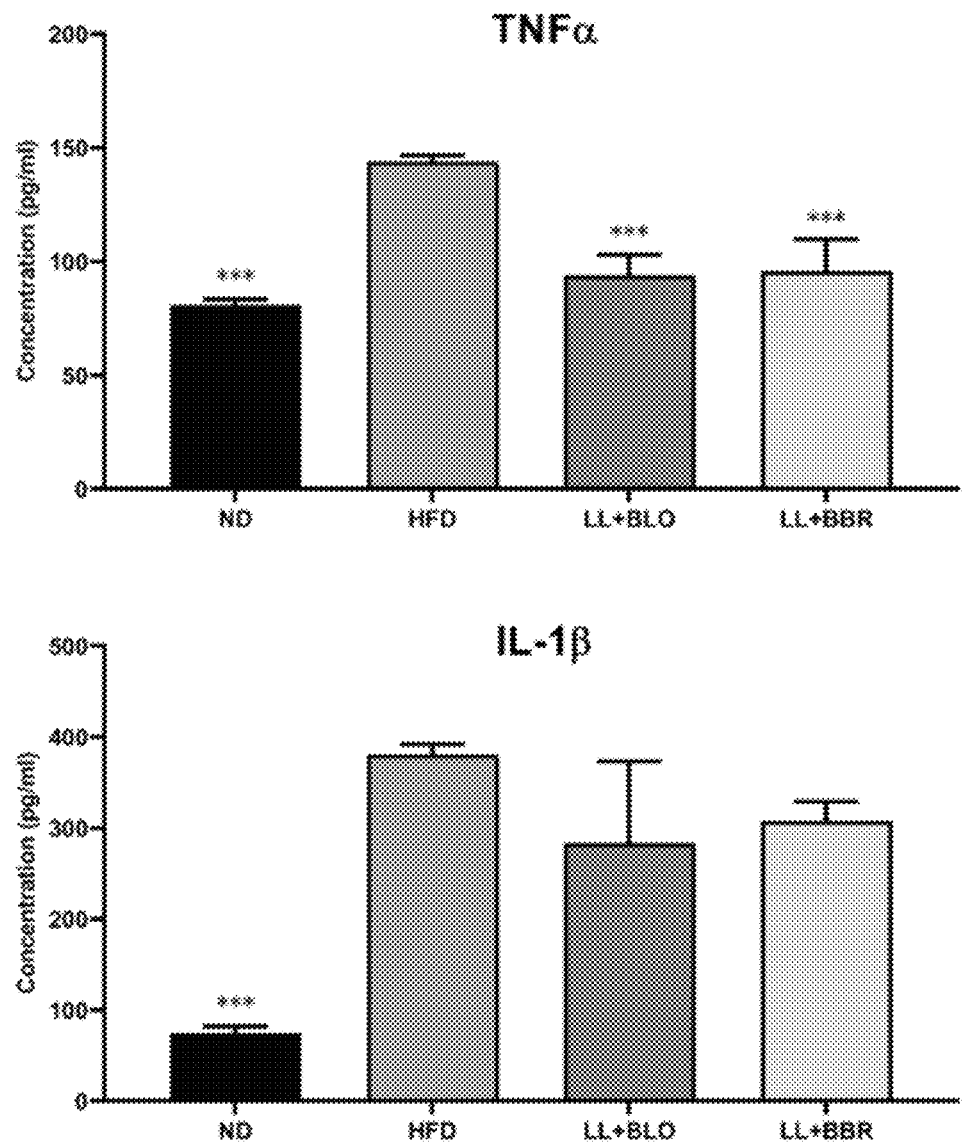

FIGS. 7a, 7b and 7c are graphs of mRNA and protein expression levels of inflammatory cytokines of mice after 9 weeks of single or composite strains of the present disclosure while feeding a normal diet or a western diet thereto (FIG. 7a: cytokine mRNA expression levels, FIGS. 7b and 7c: cytokine protein expression levels).

Figure 8:
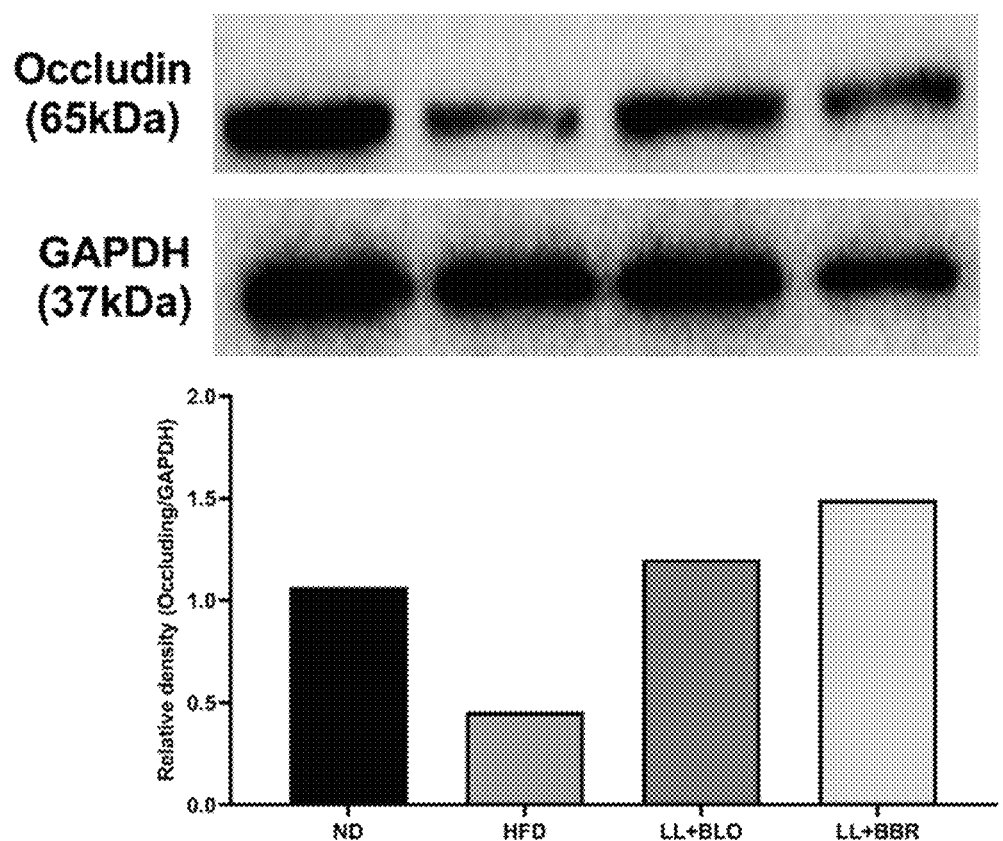

FIG. 8 is a view showing protein expression levels of occludin, a main tight junction constituent of intestinal epithelial cells in mice after 9 weeks of single or composite strains of the present disclosure while feeding a normal diet or a western diet thereto.

MODE FOR CARRYING OUT THE INVENTION

A better understanding of the present disclosure may be obtained through the following examples which are set forth to illustrate, but are not to be construed to limit, the present disclosure.

Examples

Throughout this specification, "%" used to indicate the concentration of a specific substance is (weight/weight) % for solid/solid, (weight/volume) % for solid/liquid, and (volume/volume) % for liquid/liquid.

Strain Used

The probiotics used in this experiment were isolated from fermented milk, newborn feces, and healthy adult feces. A list of strains and sources used in the present disclosure is given in Table 2.

TABLE 2

| No. | Stain | Abbreviated | Source |
|---|---|---|---|
| 1 | *Lactobacillus delbrueckii* subsp. *lactis* CKDB001 | LL | Raw milk fermentate |
| 2 | *Bifidobacterium longum* CKDB004 | BLO | Healthy adult feces |
| 3 | *Bifidobacterium breve* CKDB002 | BBR | Newborn feces |
| 4 | *Lactobacillus rhamnosus* GG | LGG | — |

Probiotics Preparation

Seed culture was performed at 37° C. for 24 hours in a flask containing MRS or BL broth for lactic acid bacteria seeds. Each culture was inoculated into an optimized medium in a fermenter (Bio Control & Science, MARADO-05D-PS). Fermentation was carried out at 37° C. for 18-20 hours while stirring at 120 rpm during which the pH was maintained constant at 5.5-6.0 by automatically adding a NaOH solution (25% w/v) to the medium. Lyophilization of 40× enriched cells was performed according to the manual (Cooling & Heating System, Lab-Mast 10). After lyophilization, colony-forming units (CFU) per 1 g of each probiotic powder were measured by serial dilution. Probiotics were suspended in 0.1 M PBS and adjusted to a density of $10^9$ CFU/mL prior to use.

Laboratory Animals

Specific-pathogen free (SPF) male C57BL/6J mice with 6 weeks of age were purchased from Dooyeol Biotech (Seoul, Korea). All mice were individually housed in steel micro-insulator cages at 22±2° C. with a light-dark cycle of 12 h/12 h. The mice had free access to water and food throughout the experiment and were monitored daily. For one week, they were acclimatized to the experimental site while being fed with a normal diet, and the group fed with a western diet (western diet or high fat diet) had an intake adaptation period of 3 days. All animals received humane treatment, and all procedures were performed in accordance with the Health Guidelines for the Care and Use of Laboratory Animals. All procedures were carried out with the approval of the Committee on Animal Care and Use of Hallym University College of Medicine.

Experimental Design

In order to examine the effects of the single and composite strains of the present disclosure on non-alcoholic fatty liver, experimental groups of 6-week-old C57BL/6 mice for the single and composite strains were designed before the experiments (see FIG. 1).

Also, examination was made of the effect of the novel strain *Lactobacillus lactis* CKDB001 (hereinafter expressed as CKDB001) of the present disclosure when it was administered alone. In this regard, the mice were divided into groups as follows: normal diet (ND); western diet (HFD); and western diet together with lactic acid bacteria (HFD+LGG, HFD+CKDB001) (see FIG. 1*a*).

In addition, the effect of the composite strain including the *Lactobacillus lactis* CKDB001 strain (expressed as LL) of the present disclosure was examined. In this regard, the mice were divided into groups as follows: normal diet (ND); western diet (HFD); western diet plus single lactic acid bacteria (LGG, LL, BLO, BBR; and western diet plus combined lactic acid bacteria (LL+BLO, LL+BBR) (see FIG. 1*b*).

Under the foregoing conditions, experiments were carried out for 9 weeks. When used alone, the lactic acid bacteria were diluted in drinking water and administered at a dose of $10^9$ CFU/day. A composite of two strains was mixed at a ratio of 1:1 and diluted in drinking water and administered at a total dose of $10^9$ CFU/day. In Examples 1 to 5 below, the experimental results of the two designs are described.

Example 1: Liver/Body Weight Ratio (LB Ratio)

After completion of the experiments, each group of the mice was measured for body weight and liver weight to analyze liver/body weight ratios. The results are depicted in FIGS. 2*a* and 2*b*. As shown in FIG. 2*a*, the LB ratio was alleviated in all the single strain-administered groups, compared to the western diet-fed group. The single strain-administered groups were measured to be lower in LB ratio than the normal diet-fed group, with the superiority of the LGG strain-administered group to the CKDB001 strain-administered group of the present disclosure in terms of LB ratio improvement.

In addition, as shown in FIG. 2*b*, the improvement of the LB ratio was observed in all the single strain-administered groups and the composite strain-administered group, compared to the western diet group. Among others, a significant improvement in LB ratio was observed in the LL+BLO group and the LL+BBR group, each including the *Lactobacillus lactis* CKDB001 strain of the present disclosure.

Example 2: Liver Histology (Steatosis and Inflammation Score)

After 9 weeks of administration, each mouse was sacrificed and the liver was taken. The liver tissue samples were fixed with 10% formalin and embedded in paraffin, followed by performing Hematoxylin and Eosin, Masson's trichrome, and reticulin stains on the liver sections.

Fatty liver (steatosis) classified by NASH Clinical Research Network Scoring System for NAFLD into grades 0-3 (0: 5%, 1:5%-33%, 2:34%-66%, 3:66% or greater steatosis). Hepatitis was classified into grades 0-3 (0: no lesion, 1: 1-2 lesions per ×20 field, 2: 2-4 lesions per ×20 field, 3: more than 4 lesions per ×20 field). All biopsy specimens were analyzed by a liver pathologist.

Steatosis Score

As shown in FIG. 3*a*, steatosis was reduced in the group fed with the single strain CKDB001 of the present disclosure, compared to the group fed with the control lactic acid strain, LGG.

In addition, as shown in FIG. 3*b*, liver steatosis scores were significantly reduced in all the single strain-administered groups (LGG, LL, BLO, BBR) compared to the western diet group. Among the composite strain-administered groups, a significant reduction in steatosis score was detected in the LL+BBR composite strain-administered group.

Therefore, it was found that the LL strain (CKDB001) of the present disclosure is superior to the other strains in terms of steatosis reduction, and a combination with *Bifidobacterium* spp., particularly with BBR brought about very excellent reduction in steatosis.

Hepatitis Score

As shown in FIG. 4*a*, hepatitis scores in the groups fed with singe strains of the present disclosure (HFD+LGG, HFD+CKDB001) were reduced to extents similar to that of the normal diet (ND)-fed group.

In addition, as shown in FIG. 4b, all the single strain-administered groups (LGG, LL, BLO, BBR) of the present disclosure significantly decreased in hepatitis score, compared to the western diet-fed group. In particular, combinations of the LL strain of the present disclosure with *Bifidobacterium* sp. strains (LL+BLO, LL+BBR) exhibited synergistic effects on hepatitis score reduction, compared to the LL strain alone.

Example 3: Liver Enzyme in Serum (AST, ALT)

Serum aspartate aminotransferase (AST) and alanine aminotransferase (ALT) were analyzed using a blood biochemistry analyzer (KoneLab 20, Thermo Fisher Scientific, Waltham, Finland).

AST Enzyme in Blood

As shown in FIG. 5a, lower AST levels were detected in the groups fed with single strains, compared to the western diet-fed group (HFD), with superiority of the CKDB001 of the present disclosure to the control LGG in terms of AST reduction effect.

As shown in FIG. 5b, all of the single strain- and composite strain-administered groups has lower AST levels than that of the western diet-fed group (HFD). Among others, the greatest synergistic effect of reducing AST levels was found in the composite group of LL+BBR of the present disclosure.

ALT Enzyme in Blood

Figure 6A:
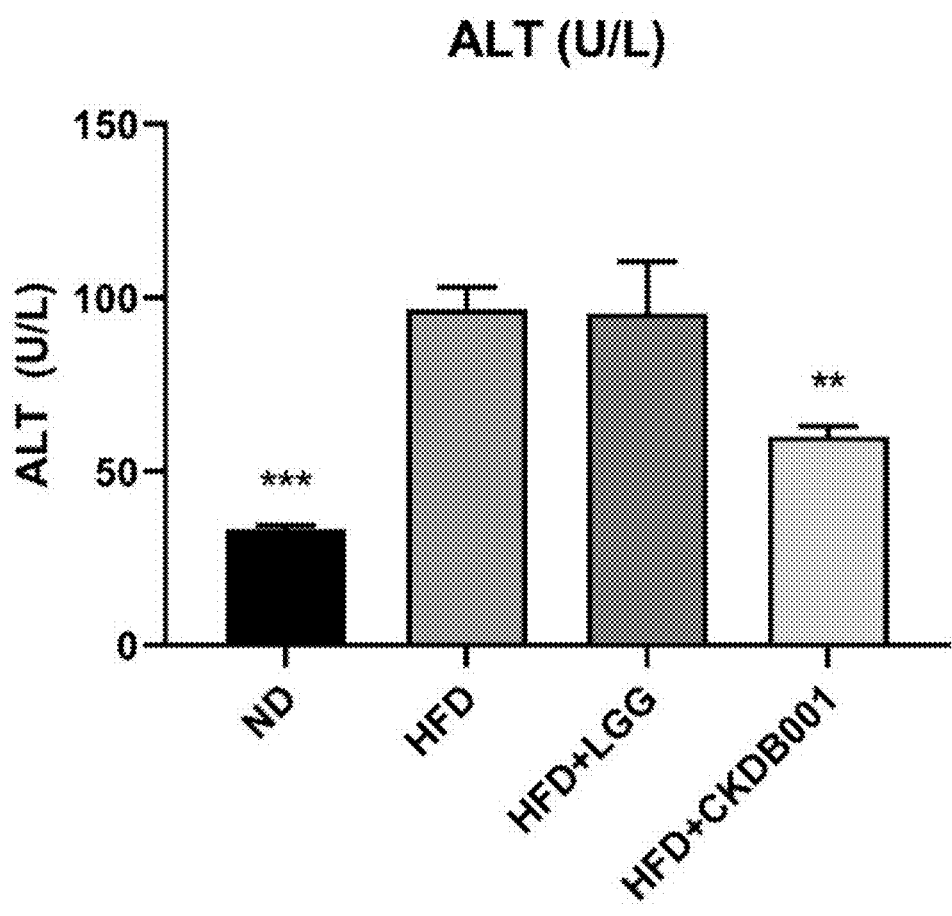

As shown in FIG. 6a, the ALT level was significantly decreased in the CKDB001 single strain administration group of the present invention compared to the western diet-fed group or the LGG-administered group.

Figure 6B:
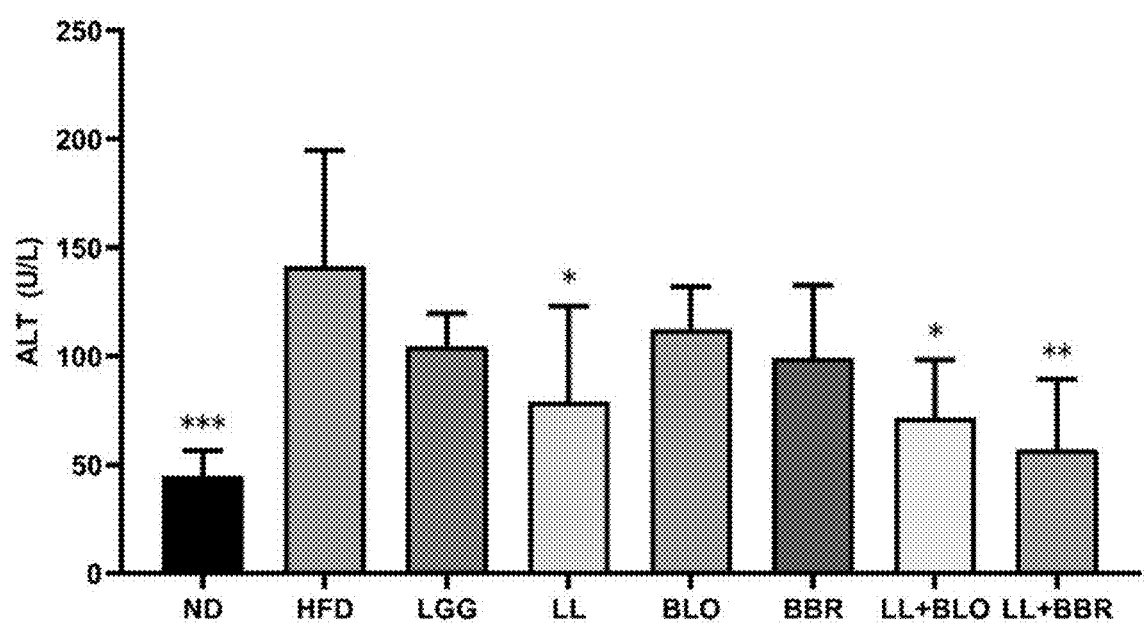

In addition, as shown in FIG. 6b, all of the single strain- and composite strain-administered groups has lower ALT levels than that of the western diet-fed group (HFD). Among others, the groups fed with composite strains of LL and *Bifidobacterium* spp. (LL+BLO and LL+BBR) were measured to decrease in ALT level in a synergistic manner in light of the group singly fed with the strain of the present disclosure.

Therefore, the *Lactobacillus lactis* CKDB001 strain (LL or CKDB001) of the present disclosure very effective in reducing AST and ALT levels, with the excellent reductive effect on AST and ALT levels in groups fed in combination with *Bifidobacterium* sp. strains (BLO and BBR).

Example 4: Inflammatory Cytokines (TNF-alpha, IL-1beta, IL-6)

In order to examine whether the *Lactobacillus lactis* CKDB001 strain of the present disclosure reduces the mRNA expression and protein expression of inflammatory cytokines in the liver, the following experiment was performed.

RNA was extracted from the liver tissue homogenate prepared by homogenizing the liver tissue of the mice, collected in Example 2, after 9 weeks of the administration of lactic acid bacteria, and cDNA was synthesized therefrom. mRNA expression levels of inflammatory cytokines (TNF-alpha, IL-1beta, IL-6) were determined by comparison with that of GAPDH (housekeeping gene) through qPCR.

Information about products used for PCR analysis is summarized in Table 3.

TABLE 3

| Gene | Product Name | Manufacturer |
| --- | --- | --- |
| TNF-alpha | Mm00443258_m1 | ThermoFisher SCIENTIFIC |
| IL-1beta | Mm00434228_m1 | |
| IL-6 | Mm00446190_m1 | |
| GAPDH | Mm99999915_g1 | |

The mRNA expression levels of individual genes in the single strain-administered group are depicted in FIG. 7a.

As shown in FIG. 7a, when the *Lactobacillus lactis* CKDB001 strain of the present disclosure was administered alone, the mRNA expression levels of inflammatory cytokines, TNF-alpha, IL-1beta, and IL-6 were observed to be significantly reduced similar to that of the normal diet group.

In the following experiments, examination was made to show whether administration of *Lactobacillus lactis* CKDB001 strain alone or in combination with *Bifidobacterium* sp. strain reduces the expression of inflammatory cytokines in the liver. After 9 weeks of administration of lactic acid bacteria, liver tissue homogenates prepared by homogenizing liver tissues of the mice, collected in Example 2, were incubated with PRO-PREP™ Protein Extraction Solution (iNtRON Biotechnology, Korea) at 4° C. for 30 minutes and then centrifuged at 10,000 g for 10 minutes. The supernatant thus formed was taken and analyzed for levels of pro-inflammatory cytokines, including tumor necrosis factor (TNF)-α, interleukin (IL)-1 beta and IL-6, by enzyme-linked immunosorbent assay (R&D Systems, Minneapolis, MN). The results are depicted in FIGS. 7b and 7c.

Consistent with the mRNA expression levels, as shown in FIG. 7b, the administration of CKDB001 of the present invention significantly reduced the secretion of inflammatory cytokines (TNF-alpha, IL-1beta, and IL-6), compared to the western diet group.

In addition, as shown in FIG. 7c, the secretion of TNF-alpha and IL-1beta was also reduced by administration of the CKDB001 strain of the present invention in combination with *Bifidobacterium* sp. strains (LL+BLO, LL+BBR).

Therefore, the administration of the *Lactobacillus lactis* CKDB001 strain of the present disclosure alone and in combination with the *Bifidobacterium* sp. strains brings about an excellent effect of alleviating western diet-induced non-alcoholic steatohepatitis.

Example 5: Expression of Tight Junction Protein in Intestinal Epithelial Cells

It is known that feeding with western diet reduces expression of tight junction proteins in intestinal epithelial cells and causes occurrence of leaky gut syndrome. The following experiments were performed to examine the effect of the *Lactobacillus lactis* CKDB001 strain of the present invention on the expression of tight junction proteins in intestinal epithelial cells.

The intestinal tissue homogenate from the composite strain-administered group (LL+BLO and LL+BBR) of the present disclosure was incubated with PRO-PREP™ Protein Extraction Solution (iNtRON Biotechnology, Korea) at 4° C. for 30 minutes and then centrifuged at 10,000 g for 10 minutes. The supernatant thus formed was quantitatively analyzed for proteins by Bradford assay, followed by electrophoresis using 10% sodium dodecyl sulfate-polyacrylamide gel (SDS-PAGE). Proteins in the polyacryamide gel were transferred to a PVDF (polyvinylidene fluoride) membrane and blocked with 5% skim milk. After washing with TBS-T, the membrane was treated with a rabbit anti-mouse occludin antibody as a primary antibody and then with an HRP-conjugated goat anti-rabbit IgG antibody as a secondary antibody.

As shown in FIG. 8, the protein expression of occludin in all of the composite strain-administered groups (LL+BLO, LL+BBR) of the present disclosure was similar to or higher than that in the normal diet-fed group.

Therefore, combined administration of the strains was found to remarkably reduce western diet-induced leaky gut syndrome.

Accession Number

Depositary Authority: Korea Research Institute of Bioscience and Biotechnology
Accession Number: KCTC14149BP
Deposition date: 20200303
Depositary Authority: Korea Research Institute of Bioscience and Biotechnology
Accession Number: KCTC13671 BP
Deposition date: 20181023
Depositary Authority: Korea Research Institute of Bioscience and Biotechnology
Accession Number: KCTC13893BP
Deposition date: 20190719

This application contains references to amino acid sequences and/or nucleic acid sequences which have been submitted concurrently herewith as the sequence listing text file entitled "000323usnp_SequenceListing.TXT", file size 6.5 kilobytes (KB), created on 20 Sep. 2022. The aforementioned sequence listing is hereby incorporated by reference in its entirety pursuant to 37 C.F.R. § 1.52(e)(5).

What is claimed is:

1. A method for treatment of steatosis or steatohepatitis, the method comprising:

administering to a subject in need thereof a pharmaceutical composition comprising a *Lactobacillus delbrueckii* subsp. *lactis* CKDB001 strain with accession number KCTC 14149BP as an active ingredient.

\* \* \* \* \*

SEQUENCE LISTING

```
<160> NUMBER OF SEQ ID NOS: 3

<210> SEQ ID NO 1
<211> LENGTH: 1561
<212> TYPE: DNA
<213> ORGANISM: Artificial Sequence
<220> FEATURE:
<223> OTHER INFORMATION: 16s rRNA of L. lactis CKDB001 KCTC14149BP

<400> SEQUENCE: 1
attgagagtt tgatcctggc tcaggacgaa cgctggcggc gtgcctaata catgcaagtc      60
gagcgagctg aattcaaaga tcccttcggg gtgatttgtt ggacgctagc ggcggatggg     120
tgagtaacac gtgggcaatc tgccctaaag actgggatac cacttggaaa caggtgctaa     180
taccggataa caacatgaat cgcatgattc aagtttgaaa ggcggcgcaa gctgtcactt     240
taggatgagc ccgcggcgca ttagctagtt ggtggggtaa aggcctacca aggcaatgat     300
gcgtagccga gttgagagac tgatcggcca cattgggact gagacacggc ccaaactcct     360
acgggaggca gcagtaggga atcttccaca atggacgcaa gtctgatgga gcaacgccgc     420
gtgagtgaag aaggtcttcg gatcgtaaag ctctgttgtt ggtgaagaag gatagaggca     480
gtaactggtc tttatttgac ggtaatcaac cagaaagtca cggctaacta cgtgccagca     540
gccgcggtaa tacgtaggtg gcaagcgttg tccggattta ttgggcgtaa agcgagcgca     600
ggcggaatga taagtctgat gtgaaagccc acggctcaac cgtggaactg catcggaaac     660
tgtcattctt gagtgcagaa gaggagagtg gaactccatg tgtagcggtg gaatgcgtag     720
atatatggag gaacaccagt ggcgaaggcg gctctctggt ctgcaactga cgctgaggct     780
cgaaagcatg ggtagcgaac aggattagat accctggtag tccatgccgt aaacgatgag     840
cgctaggtgt tggggacttt ccggtcctca gtgccgcagc aaacgcatta agcgctccgc     900
ctggggagta cgaccgcaag gttgaaactc aaaggaattg acggggcccc gcacaagcgg     960
tggagcatgt ggtttaattc gaagcaacgc gaagaacctt accaggtctt gacatcctgc    1020
gctacaccta gagataggtg gttcccctcg gggacgcaga gacaggtggt gcatggctgt    1080
cgtcagctcg tgtcgtgaga tgttgggtta agtcccgcaa cgagcgcaac ccttgtcttt    1140
```

```
agttgccatc attaagttgg gcactctaaa gagactgccg gtgacaaacc ggaggaaggt      1200
ggggatgacg tcaagtcatc atgcccctta tgacctgggc tacacacgtg ctacaatggg      1260
cagtacaacg agaagcgaac ccgcgagggt aagcggatct cttaaagctg ctctcagttc      1320
ggactgcagg ctgcaactcg cctgcacgaa gctggaatcg ctagtaatcg cggatcagca      1380
cgccgcggtg aatacgttcc cgggccttgt acacaccgcc cgtcacacca tggaagtctg      1440
caatgcccaa agtcggtgag ataaccttta taggagtcag ccgcctaagg cagggcagat      1500
gactggggtg aagtcgtaac aaggtagccg taggagaacc tgcggctgga tcacctcctt      1560
t                                                                      1561

<210> SEQ ID NO 2
<211> LENGTH: 1455
<212> TYPE: DNA
<213> ORGANISM: Artificial Sequence
<220> FEATURE:
<223> OTHER INFORMATION: 16s rRNA of B. longum CKDB004 KCTC13671BP

<400> SEQUENCE: 2
gctcaggatg aacgctggcg gcgtgcttaa cacatgcaag tcgaacggga tccatcaggc        60
tttgcttggt ggtgagagtg cgaacgggt gagtaatgcg tgaccgacct gccccataca       120
ccggaatagc tcctggaaac gggtggtaat gccggatgct ccagttgatc gcatggtctt       180
ctgggaaagc tttcgcggta tgggatgggg tcgcgtccta tcagcttgac ggcggggtaa       240
cggcccaccg tggcttcgac gggtagccgg cctgagaggg cgaccggcca cattgggact       300
gagatacggc ccagactcct acgggaggca gcagtgggga atattgcaca atgggcgcaa       360
gcctgatgca gcgacgccgc gtgagggatg gaggccttcg ggttgtaaac ctcttttatc       420
ggggagcaag cgagagtgag tttacccgtt gaataagcac cggctaacta cgtgccagca       480
gccgcggtaa tacgtagggt gcaagcgtta tccggaatta ttgggcgtaa agggctcgta       540
ggcggttcgt cgcgtccggt gtgaaagtcc atcgcttaac ggtggatccg cgccgggtac       600
gggcgggctt gagtgcggta ggggagactg gaattcccgg tgtaacggtg gaatgtgtag       660
atatcgggaa gaacaccaat ggcgaaggca ggtctctggg ccgttactga cgctgaggag       720
cgaaagcgtg gggagcgaac aggattagat accctggtag tccacgccgt aaacggtgga       780
tgctggatgt ggggcccgtt ccacgggttc cgtgtcggag ctaacgcgtt aagcatcccg       840
cctggggagt acgccgcaa ggctaaaact caaagaaatt gacggggggcc cgcacaagcg       900 gcggagcatg cggattaatt cgatgcaacg cgaagaacct tacctgggct tgacatgttc       960
ccgacggtcg tagagatacg gcttcccttc ggggcgggtt cacaggtggt gcatggtcgt      1020
cgtcagctcg tgtcgtgaga tgttgggtta agtcccgcaa cgagcgcaac cctcgccccg      1080
tgttgccagc ggattatgcc gggaactcac ggggaccgc cggggttaac tcggaggaag      1140
gtggggatga cgtcagatca tcatgcccct tacgtccagg gcttcacgca tgctacaatg      1200
```

```
gccggtacaa cgggatgcga cgcggcgacg cggagcggat ccctgaaaac cggtctcagt    1260
tcggatcgca gtctgcaact cgactgcgtg aaggcggagt cgctagtaat cgcgaatcag    1320
caacgtcgcg gtgaatgcgt tcccgggcct tgtacacacc gcccgtcaag tcatgaaagt    1380
gggcagcacc cgaagccggt ggcctaaccc cttgtgggat ggagccgtct aagtgaggct    1440
cgtgattggg actaa                                                    1455

<210> SEQ ID NO 3
<211> LENGTH: 1417
<212> TYPE: DNA
<213> ORGANISM: Artificial Sequence
<220> FEATURE:
<223> OTHER INFORMATION: 16s rRNA of B. breve CKDB002 KCTC13893BP

<400> SEQUENCE: 3
gctcaggatg aacgctggcg gcgtgcttaa cacatgcaag tcgaacggga tccaggcagc      60
ttgctgcctg gtgagagtgg cgaacgggtg agtaatgcgt gaccgacctg ccccatgcac     120
cggaatagct cctggaaacg gtggtaatg ccggatgctc catcacaccg catggtgtgt     180
tgggaaagcc tttgcggcat gggatggggt cgcgtcctat cagcttgatg gcggggtaac     240
ggcccaccat ggcttcgacg ggtagccggc ctgagagggc gaccggccac attgggactg     300
agatacggcc cagactccta cgggaggcag cagtggggaa tattgcacaa tgggcgcaag     360
cctgatgcag cgacgccgcg tgagggatgg aggccttcgg gttgtaaacc tcttttgtta     420
gggagcaagg cactttgtgt tgagtgtacc tttcgaataa gcaccggcta actacgtgcc     480
agcagccgcg gtaatacgta gggtgcaagc gttatccgga attattgggc gtaaagggct     540
cgtaggcggt tcgtcgcgtc cggtgtgaaa gtccatcgct taacggtgga tccgcgccgg     600
gtacgggcgg gcttgagtgc ggtaggggag actggaattc ccggtgtaac ggtggaatgt     660
gtagatatcg ggaagaacac caatggcgaa ggcaggtctc tgggccgtta ctgacgctga     720
ggagcgaaag cgtggggagc gaacaggatt agataccctg gtagtccacg ccgtaaacgg     780
tggatgctgg atgtggggcc cgttccacgg gttccgtgtc ggagctaacg cgttaagcat     840
cccgcctggg gagtacggcc gcaaggctaa aactcaaaga aattgacggg ggcccgcaca     900
agcggcggag catgcggatt aattcgatgc aacgcgaaga accttacctg gcttgacat     960 gttcccgacg atcccagaga tggggtttcc cttcggggcg ggttcacagg tggtgcatgg    1020
tcgtcgtcag ctcgtgtcgt gagatgttgg gttaagtccc gcaacgagcg caaccctcgc    1080
cccgtgttgc cagcggatta tgccgggaac tcacggggga ccgccggggt taactcggag    1140
gaaggtgggg atgacgtcag atcatcatgc cccttacgtc cagggcttca cgcatgctac    1200
aatggccggt acaacgggat gcgacagtgc gagctggagc ggatccctga aaccggtct    1260 cagttcggat cgcagtctgc aactcgactg cgtgaaggcg gagtcgctag taatcgcgaa    1320
tcagcaacgt cgcggtgaat gcgttcccgg gccttgtaca caccgcccgt caagtcatga    1380
aagtgggcag cacccgaagc cggtggccta accccttt                             1417
```